United States Patent [19]

Brown et al.

[11] Patent Number: 4,534,098

[45] Date of Patent: Aug. 13, 1985

[54] APPARATUS FOR APPLYING ASSEMBLED CONNECTOR TERMINALS AND THE LIKE TO A PLURALITY OF LEADS

[75] Inventors: Vincent B. Brown, Prospect Heights; Donald G. Schreiner, Wheeling, both of Ill.

[73] Assignee: Methode Electronics, Inc., Chicago, Ill.

[21] Appl. No.: 189,293

[22] Filed: Sep. 19, 1980

Related U.S. Application Data

[62] Division of Ser. No. 63,849, Aug. 6, 1979, Pat. No. 4,253,222.

[51] Int. Cl.[3] ........................ B23P 19/02; H01R 43/00

[52] U.S. Cl. .................................... 29/564.8; 29/749; 29/857

[58] Field of Search ................. 29/564.4, 564.1, 564.8, 29/748, 749, 755, 857

[56] References Cited

U.S. PATENT DOCUMENTS

| | | | |
|---|---|---|---|
| 3,939,552 | 2/1976 | Hart et al. | 29/867 |
| 4,136,440 | 1/1979 | Brandewie et al. | 29/564.4 X |
| 4,235,015 | 11/1980 | Funcik et al. | 29/857 |

*Primary Examiner*—William R. Briggs
*Attorney, Agent, or Firm*—Charles F. Pigott, Jr.

[57] ABSTRACT

Apparatus for applying connector terminals to a plurality of leads including tensioning means capable of individually tensioning the leads with a predetermined tension, while being gripped and advanced by clamping means for advancing the leads into a terminal. Also, the clamping means may define a forward end which carries a wire guide plate which, in turn, is adapted to be longitudinally slidable back and forth in the direction of advancement, and is spring-biased into an outward position. The leads pass through apertures of the guide plate for precise positioning, relative to the terminal or terminals. The guide plate is thus retractable to permit the free ends of the leads to project into the terminal. Also, a lead-lengthening probe may be provided.

1 Claim, 22 Drawing Figures

FIG. 1
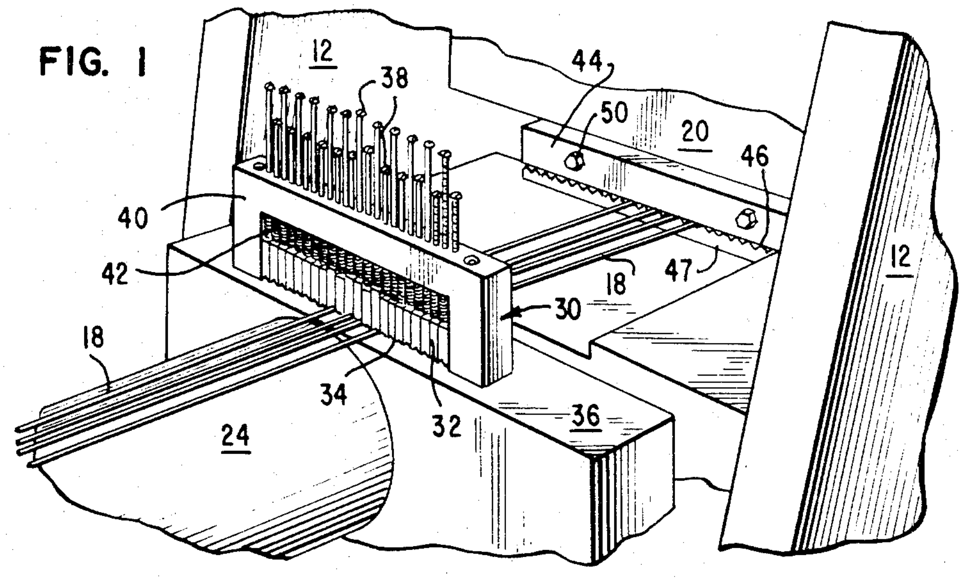
FIG. 2
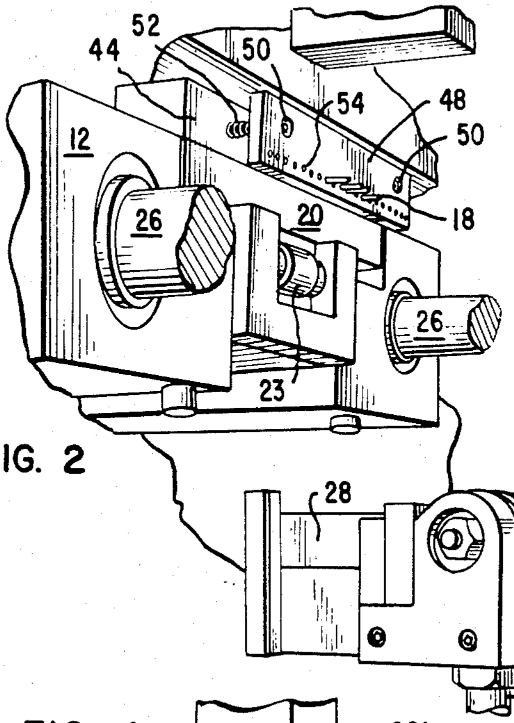
FIG. 3A
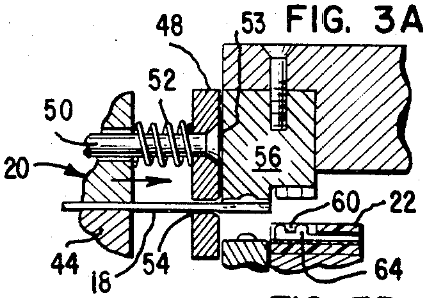
FIG. 3B
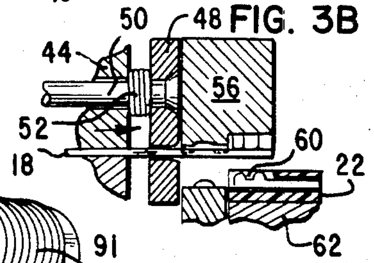
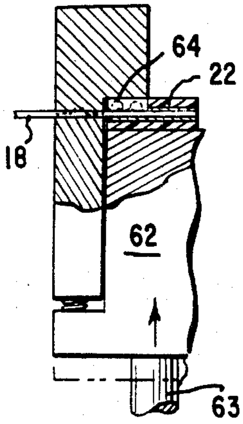
FIG. 3C
FIG. 4
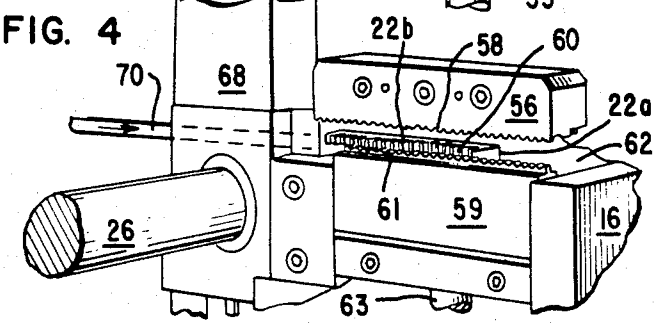

FIG. 7
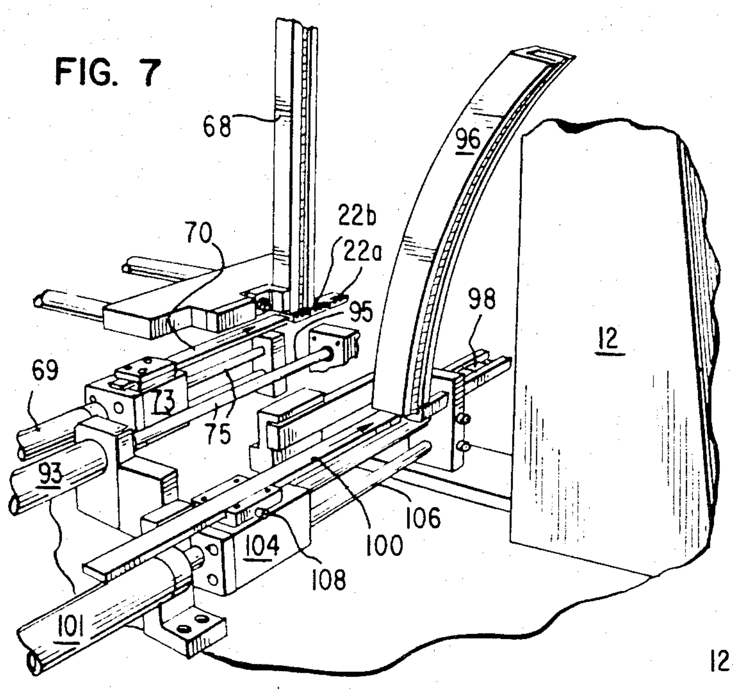
FIG. 11
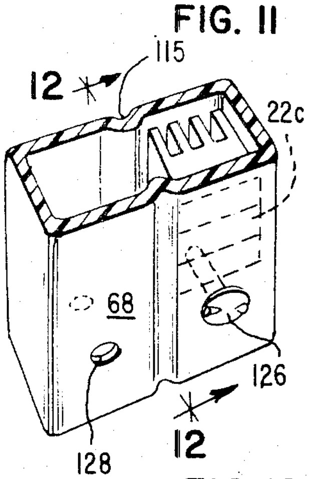
FIG. 12
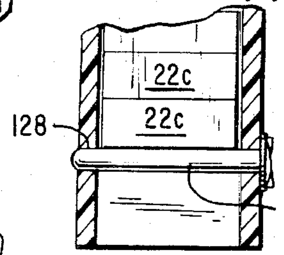
FIG. 8
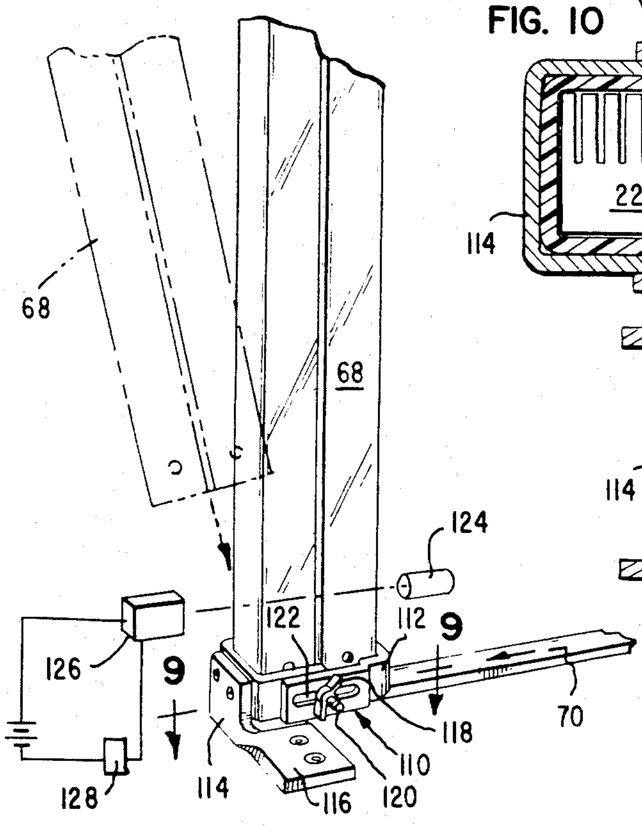
FIG. 10
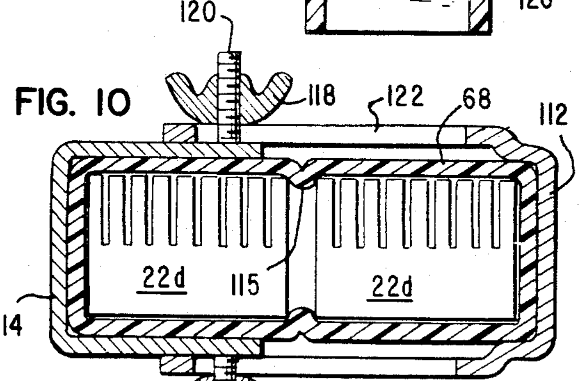
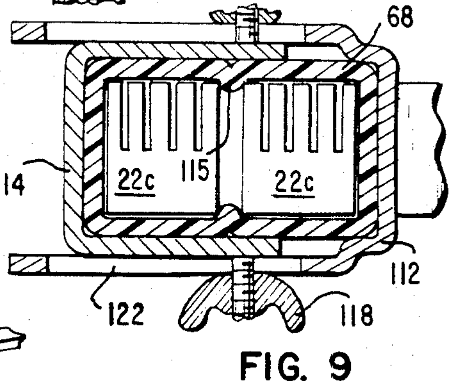
FIG. 9

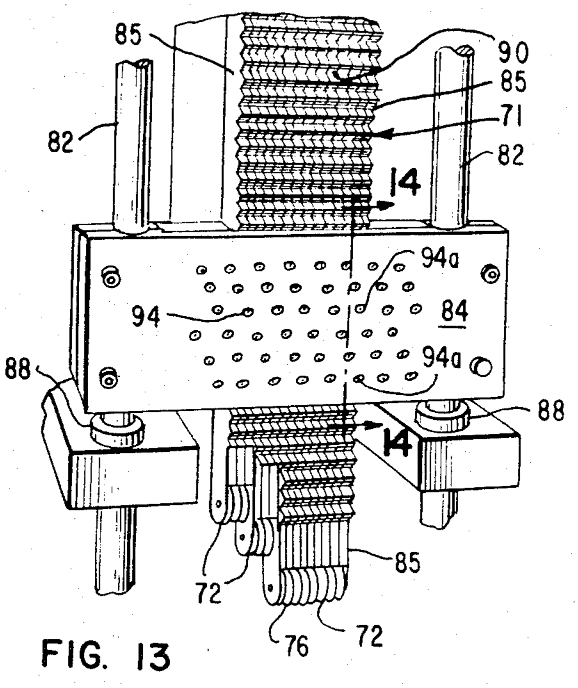
FIG. 13
FIG. 14
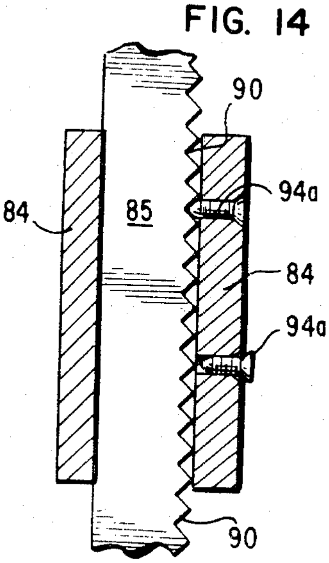
FIG. 15
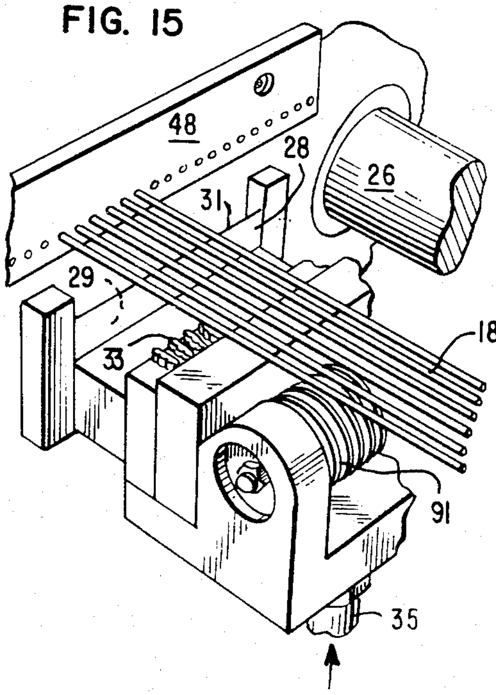
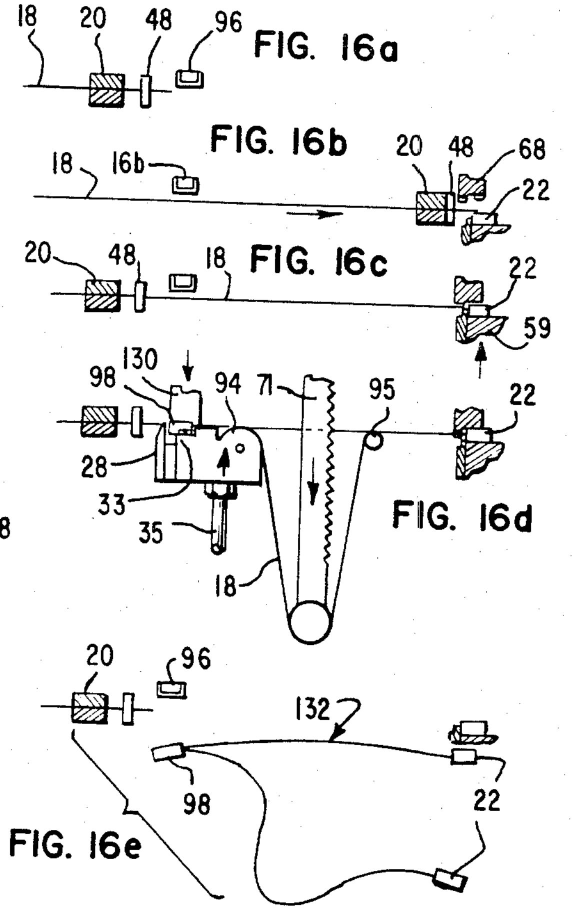

APPARATUS FOR APPLYING ASSEMBLED CONNECTOR TERMINALS AND THE LIKE TO A PLURALITY OF LEADS

CROSS REFERENCE TO RELATED APPLICATION

This application is a division of application Ser. No. 63,849, filed Aug. 6, 1979, now U.S. Pat. No. 4,253,222.

BACKGROUND OF THE INVENTION

Wiring harnesses comprise leads of insulated electrical wire having one or more ends terminating in a multiple lead terminal or terminals and are widely used in many different types of electrical and electronic apparatus. For example, Folk, U.S. Pat. No. 3,875,662 and Folk, et al. U.S. Pat. No. 4,043,017 show differing wiring harness manufacturing apparatus for automatically inserting the leads into terminals.

In this type of apparatus, it is known to grip and advance the leads toward a terminal, and to automatically insert the leads into the terminal. Also, at some time in the process the leads are automatically severed away from the main supply of lead wire material, for example spools of coiled electrical wire.

In prior apparatus designs, certain disadvantages have existed. As the leads are clamped and advanced toward engagement with a terminal, it is desirable for the leads to be held under a predetermined tension as they are advanced. However, a simple bar clamp or the like may not provide precise enough tension on the individual leads, because the individual diameters of the respective leads may be variable. The result of this may be that one lead of reduced diameter slides almost freely without tension, while another lead in the same group, having a larger diameter, is very tightly clamped. This can result in malfunctions of the process, and a significant amount of failure of production of wiring harnesses.

Also, as the leads are clamped and advanced, a forward end portion of each lead must project from the clamp to permit its engagement with the terminal, However, these projecting ends can frequently twist and bend, due for example to the elastic memory of their insulating coatings, with the result that in prior art machines, failures of the lead ends to properly engage with the terminal are a significant possibility.

By this invention, the problem can be eliminated by means of a retractable guide plate as described above.

Furthermore, means are provided in the device of this invention for causing the apparatus to manufacture wiring harnesses in which the individual leads may be of differing lengths. The individual pattern of the differing lengths may be easily changed, with relatively minor adjustment of the apparatus.

Likewise, other functional improvements and efficiencies of opertion are provided by the device of this invention.

DESCRIPTION OF THE INVENTION

This invention relates to apparatus for applying terminals such as assemlbed connectors to a plurality of leads, including clamping means for gripping and advancing the leads from a supply source toward a terminal. Means are provided for bringing the terminal and the leads into electrically conductive engagement, for example, by moving the terminal into engagement with the leads as described below.

Means are also provided for severing the leads into segments of predetermined length.

In acordance with this invention, tensioning means are provided, which are capable of individually tensioning the leads with a predetermined tension, while being gripped and advanced by the clamping means. This tensioning means comprises individual spring-biased feet, each lead being frictionally pressed by an individual spring-biased foot against a stationary surface to frictionally impede the advancement of each lead. Thus, each spring-biased foot provides a predetermined amount of pressure against the lead which is essentially invariant relative to variations in the lead diameter.

The reason for this is that the variations in the diameter of the leads will simply result in each spring-biased foot riding in a position which is higher or lower than the neighbor spring-biased feet, in exert the predetermined frictional force upon the leads. If the diameter of the lead is 0.03 inch more than called for by the specification at a given point of the lead wire, all that happens is that the foot rides that much higher on the lead. Also differently-sized insulated lead wires may be simultaneously processed into a single harness, ranging, for example, from 22 to 29 American Wire Gauge. The biasing force against the lead wire due to the compression of the spring changes only negligably under these circumstances, so that pressure against the lead may be essentially invariant relative to variations in the lead diameter.

The same, of course, holds true in the event that the lead is of smaller diameter than specified in the ideal design, with the spring-biased foot merely correspondingly lowering a few thousandths of an inch, or more as the case may be, without a significant change in the bias pressure against the lead which is produced by the spring of the individual pressure foot.

Thus, the individual leads of differing diameters are all subjected to the predetermined and desired tension which is best for optimum operation of the apparatus.

As a further improvement in accordance with this invention, the clamping means described above may define a forward end which carries wire guide plate means. The guide plate means are adapted to be longitudinally slidable back and forth in the direction of advancement of the free end portion. Spring means bias the wire guide plate means outwardly from the forward end.

Apertures are defined in the guide plate means through which free ends of the clamped leads can project. Preferably, the free ends of the clamped leads are approximately flush with the outer surface of the guide plate means in its outwardly extending slidable position. This may be accomplished by placing a lead severing member, which may be a shearing blade or the like, in a position to shear the leads just in front of the front edge of the wire guide plate.

The wire guide plate precisely positions the leads, so that as the clamping means grips and advances them, they are precisely positioned for securance within the individual recesses of the terminal. The leads are retained firmly and with precise positioning within the wire guide plate to prevent twisting and bending of the leads due to elastic memory or the like in the insulating coatings, which twisting and bending, if allowed to take place, can cause the ends of some of the leads to miss their allotted recess in the terminal.

As the leads are brought into engagement with the terminal by the advancing means, the wire guide plate may be pushed into its retracted position, closest to the forward end of the clamping means, allowing the leads to individually project outwardly from the wire guide plate and into the terminal for securance thereto in electrically conductive relationship.

It is also preferred for the apparatus of this invention to be equipped with lead-lengthening probe means. The probe means are proportioned to transversely engage at least one of the leads at a position between its ends, and to move it at that position transversely of the direction of its advancement. The effect of this is to lengthen the amount or the length of the lead wire which is advanced beyond the severing means, so that when the severing means operates a longer lead wire is provided in connected relationship with the terminal.

If desired, the probe means can define a plurality of lead-engaging ends which are spaced in differing transverse positions. As the result of this, leads of differing lengths may be produced in a manner which may be precisely controlled in accordance with the desired design of wiring harness.

It may also be desirable for the rear ends of the severed lead to be attached to a second terminal or, if desired, multiple terminals may be added to the rear ends of the leads in accordance with this invention. Alternatively, wire stripping means may be used to strip the lead ends at the point of severing, without adding a terminal.

Referring to the drawings,

FIG. 1 is a fragmentary perspective view of an apparatus in accordance with this invention, showing the clamping means for gripping and advancing the leads toward a terminal, taken from the rear side of the gripping and advancing means.

FIG . 2 is a fragmentary perspective view of the same apparatus as FIG. 1, showing a view of the front side of the clamping means for gripping and advancing the leads.

FIG. 3*a* is a fragmentary longitudinal sectional view of a portion of the apparatus as shown in FIG. 2, showing a lead wire having been advanced by the clamping means and about to be brought into electrically conductive engagement with a terminal.

FIG. 3*b* and 3*c* are fragmentary longitudinal sectional views showing further steps in the process begun in FIG. 3*a*.

FIG. 4 is a fragmentary perspective view of the portion of the apparatus which receives the free ends of the lead wires which are advanced by the clamping means, and which holds and positions the terminal.

FIG. 7 is a fragmentary perspective view, with portions removed, of the apparatus of this application seen from the opposite side from the view of FIG. 6.

FIG. 8 is a fragmentary perspective view, showing how a terminal casting magazine may be attached and disconnected from an adjustably-sized receiver member.

FIG. 9 is a sectional view taken along line 9—9 of FIG. 8.

FIG. 10 is a sectional view similar to FIG. 9, showing the adjustable magazine receiver in a different position for receiving a larger set of terminal castings.

FIG. 11 is a fragmentary perspective view, with portions broken away, showing the detailed lower portion of the terminal casting magazine of FIG. 8.

FIG. 12 is a sectional view taken along line 12—12 of FIG. 11.

FIG. 13 is a fragmentary perspective view, similar to a portion of FIG. 5, showing the lead wire lengthening mechanism in a downwardly advanced position, and with a different pattern of adjustment.

FIG. 14 is a fragmentary sectional view taken along line 14—14 of FIG. 13.

FIG. 15 is an enlarged perspective view of some of the structure of FIG. 6, showing the cutter bar and lead wire mechanism for emplacing it in terminal castings.

Figure 5:
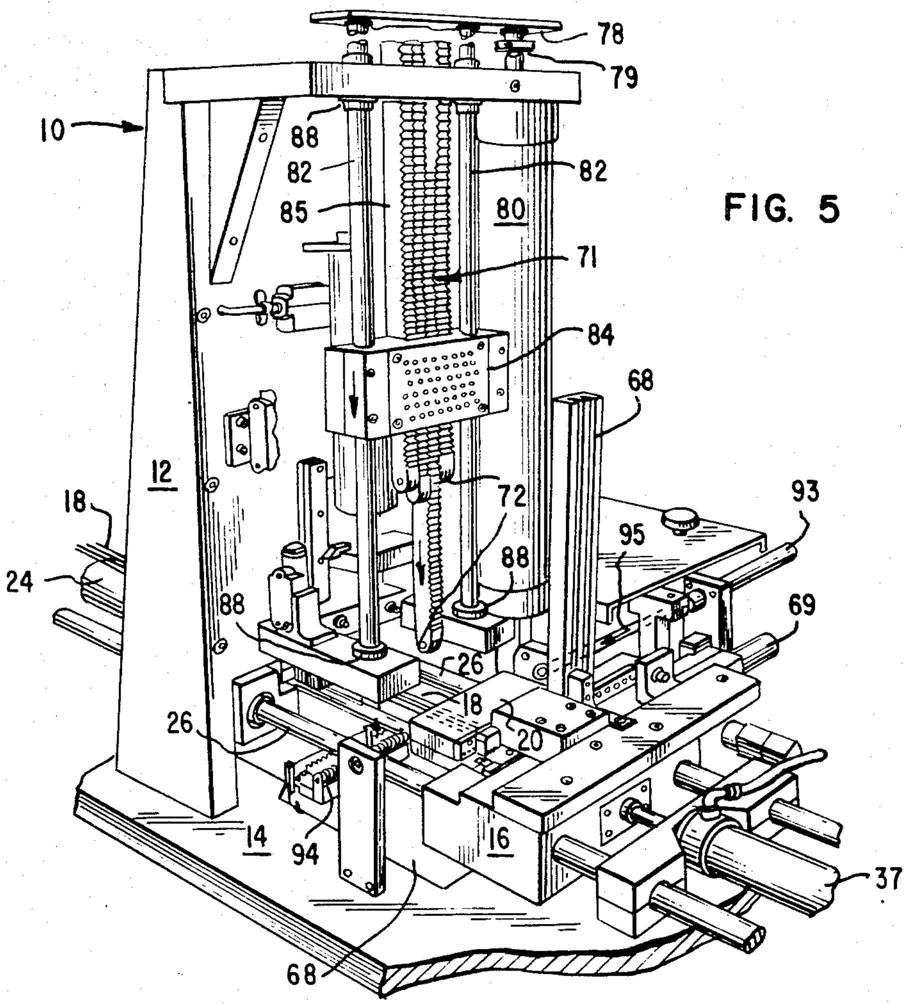
FIG. 5 is a perspective view of the apparatus of this invention as seen from the forward side of the gripping and advancing means, and showing the gripping and advancing means in its fully advanced position.

FIGS. 16*a* through 16*e* are schematic views of steps of operation of the apparatus shown.

Referring to the drawings, apparatus 10 for applying assembled connector terminals to a plurality of leads for producing wiring harnesses and the like is disclosed. The apparatus includes a frame 12 (FIG. 5) which defines a first station, supported on a base 14. Second frame 16 defines a second station for processing of the apparatus.

Lead wires 18 are provided from a supply source such as spools of wire, and may be clamped by clamping means 20, which are adapted for gripping the leads 18 at the first station 12, and then advancing the leads 18 to the second station 16 where the free ends of the leads are brought into electrically conductive engagement with a terminal casting or connector 22 as shown, for example, in FIGS. 3*a* through 3*c*. Clamping means 20 may be pneumatically advanced and retracted by cylinder 24 along rails 26 back and forth between the two stations 12, 16. Knuckle 23 (FIG. 2), is adapted to receive the actuating arm of cylinder 24 for moving clamping means 20.

Cutter bar 28 (FIG. 2) is provided to sever the rear ends of leads 18. Means may be provided for attaching one or more terminals to the rear ends of leads 18, as well as the forward ends thereof as shown herein.

As shown most specifically in FIG. 15, cutter bar 28 may be of a cross section as shown at 29 to define a sharp edge 31.

Conventional wire pushing members 33 (FIG. 15) are also provided to push the rear, severed ends of lead wires 18 into connection with terminals as shown below. After severing wires 18 by cutter bar 28, forward cylinder 37 can advance all of station 16 and member 20 to bring the cut ends of leads 18 to the position where they can be pressed into rear terminals by wire pushing members 33. Wire pushing members 33 are operated by piston 35, which also operates cutter bar 28 in simultaneous manner, for upward and downward action, to cut the leads 18 and to install then in one or more terminals. Alternatively, wire stripping means may be used herein, when immediate connection with a terminal is not desired.

In accordance with this invention, as in FIG. 1, positioned before the gripping and advancing means 20 are tensioning means 30, which are capable of individually tensioning the leads 18 with a predetermined tension, while being gripped and advanced by the clamping means 20, so that the mode of advancement of the leads 18 is constant with every repetition of the manufacturing cycle, and slack is not developed in the leads 18.

Tensioning means 30 comprises individual, spring-biased feet 32, each defining a concave or wedge-shaped bottom 34 to receive an individual lead 18, and to press it against stationary surface 36, shown here to be a retention block as part of the structure of the machine, to frictionally impede the advancement of each lead 18. Pins 38 are shown to be retained in frame 40 through apertures in the upper portion of frame 40. Each individual pin 38 is attached to an individual foot 32, with the pins being of alternatingly long and short length to facilitate manual grasping of any individual pin. Coil springs 42 are each positioned around an individual pin 38, and are pressed in biasing relation between frame 40 and individual feet 32, to bias feet 32 downwardly against surface 36.

Accordingly, each spring-biased foot provides a predetermined amount of pressure against the lead 18 that passes under it, which spring-biased pressure is essentially invariant relative to variations in the diameter of the lead over at least a relatively small range. In other words, if one lead 18 happens to be 0.04 inch greater in diameter than another lead 18, or if a portion of the lead is of thicker diameter than another portion of the same lead 18, each spring mounted foot 32 which presses against surface 36 will merely ride upwardly and downwardly on the various leads guided by pins 38, in response to this variation. At the same time, the amount of spring bias force exerted by spring 42 in that instance will change only a negligible amount with respect to a neighboring lead 18 which is of a slightly different diameter, so that essentially invariant frictional resistance is applied to all of the leads 18.

The length of each spring 42 may be increased to provide increased invariance in the spring-biased pressure to any extent that is desired for the operation of the apparatus.

As shown, a substantial number of feet 32 are not in use in the particular harness manufacturing step shown. The machine specifically shown has the capability of making relatively small harnesses with few leads 18 as shown, and also harnesses having many more leads, without need to modify the apparatus.

Clamping assembly means 20 has an upper clamping bar 44 which may be moved upwardly for releasing leads 18 and downwardly for gripping them, operated by an air cylinder which moves with means 20. Leads 18 rest in grooves or slots 46 of lower bar 47 as shown which are proportioned to be smaller in size than the leads 18, so that clamping bar 44 may firmly grip them in immovable clamping relation while advancing toward station 16, and then releasing them.

As in the case of tensioning means 30, clamping assembly 20 has a capacity to receive a large number of leads 18 simultaneously, but is also capable of operating as shown with a relatively small number of leads when that is desired.

As shown in FIG. 1, clamping assembly 20 is shown in its rearward sliding position, where it is adjacent first station 12 for receiving and clamping leads 18. In FIG. 5, clamping assembly 20 is shown to be advanced by means of pneumatic cylinder 24 to advance the ends of leads 18 to second station 16 for attachment to terminal or terminals 22, positioned in the manner shown in FIGS. 3 and 4.

On the front end of upper clamping bar 44, as shown for example in FIG. 2, wire guide plate 48 is carried, being slidable in the direction of motion of lead wires 18 and clamping bar 44 along pins 50.

A coil spring 52 is provided on each pin 50 to bias plate 48 outwardly from clamping bar 44.

As shown in FIG. 3*a*, pins 50 are appropriately countersunk so that their heads 53 are recessed into plate 48.

Lead wires 18 are adapted to project through the apertures 54 defined in plate 48. The number of apertures 54 correlate with the number of feet 32 and the number of grooves 46, so that each lead wire 18 will interact with a separate foot 34 and groove 46, and will pass through a separate aperture 54. Preferably, leads 18 initially project only slightly outwardly from or are flush with the outer surface of plate 48, as shown for example in FIG. 3*a*. The lead wires 18 may have been previously severed by cutting bar 28 at a position immediately adjacent to the front edge of guide plate 48 at the beginning of an operating cycle of the apparatus of this invention as described herein.

After the lead cutting step by cutting bar 28, the clamping assembly 20 is advanced toward second station 16, pulling the lead wires 18 with it, which unroll off of spools, for example, or are provided from any other desired source.

FIG. 4 shows second station 16 from the side which faces clamping assembly 20.

Comb-like guide plate 56 defines on its bottom edge a plurality of teeth 58 which serve as guides for the lead wires 18 to assist in their alignment for engagement with recesses 60 in a terminal 22.

Lower guide plate 59 defines on its upper edge a corresponding plurality of teeth 61 to also assist in the alignment of lead wires 18.

As shown in FIG. 3*a*, clamping assembly 20 advances until guide plate 48 abuts against comb plate 56. Upon further advancement of clamping assembly 20 as in FIG. 3*b*, guide plate 48 is collapsed by the pressure against immovable comb plate 56, causing each lead wire 18 to project outwardly through aperture 54 by a distance sufficient to permit entering into adjacent relationship with the mouth of an aperture 60 of terminal 22. Thereafter, platen 62, impelled for example by a pneumatically operated shaft 63, is pushed upwardly as in FIG. 3*c* to force the ends of lead wires 18 into the apertures 60 of terminal 22, where connector prongs 64 penetrate the insulating coating of wire 18 in conventional manner to provide electrical contact between terminal 22 and leads 18. In the specific design of connection shown, terminal apertures 60 are adapted to receive an electrically connective pin from another connector or the like which can enter into electrically conductive contact with prongs 64.

Magazine 68 (FIG. 7) is adapted to receive and hold a stack of terminals 22 for automatic feeding to the apparatus for connection. Push rod 70 feeds the terminals 22 from the bottom of magazine 68, impelled as desired by pneumatic cylinder 69, to drive each terminal 22 to a predetermined location on platen 62 in alignment with the apertures defined between prongs 58 of comb plate 56. Push rod 70 is carried by bracket 73, which reciprocates along rails 75, operated by cylinder 69. Thereafter, push rod 70 is withdrawn to engage another terminal 22 in magazine 68.

If desired, several terminals 22*a*, 22*b*, etc. as shown in FIG. 7 may be advanced to simultaneous, predetermined positions, to be connected with lead wires 18 simultaneously to form multiple connectors of the same wiring harness. This is simply done by programming push rod 70 to reciprocate to appropriately position the respective terminals 22*a,* 22*b* as desired, or by using a magazine 68 having multiple stacks of terminals.

Clamping member 20 is then advanced in the manner previously described to align the ends of lead wires 18 over the apertures 60 of terminal 22, followed by the raising of platen 62 to install the lead wires 18 in the terminal.

Thereafter, platen 62 is lowered again. Cutter bar 28 may be actuated to cut the other ends of leads 18, and the completed wiring harness comprising leads 18 and terminals 22 can fall out of the bottom of the machine through aperture 68.

The rear ends of lead wires 18 may also be attached to one or more terminals which may be generally similar in design to terminal 22 by means of a structure similar to the above.

Specifically, rear magazine 96 is shown in FIG. 7 for feeding terminals 98 to apparatus 33 (FIG. 15) for forcing the connectores 98 onto lead wires 18. Push rod 100 may be appropriately operated by a pneumatic cylinder 101 in a manner similar to push rod 70, to properly position the connectors 98 in the manner desired, when it is desired for the rear end of the wiring harness to also carry connectors.

As a further feature of the invention of this application, a lead lengthening probe 71 is provided, being adapted to reciprocate in the direction which is transverse of the direction of advancement of lead wires 18. Probe 71, in its specific embodiment shown, defines an elongated end 72 which define grooved rotatable discs 76 which are adapted to transversely engage one or more of the lead wires 18 at a position between the ends of lead wires 18.

Lead lengthening probe 71 is carried by rods 82 which, in turn, are movable upward and downwardly by pneumatic cylinder 80, being driven by platen 78, actuated by cylinder 80, and guided through bushings 88.

Figure 6:
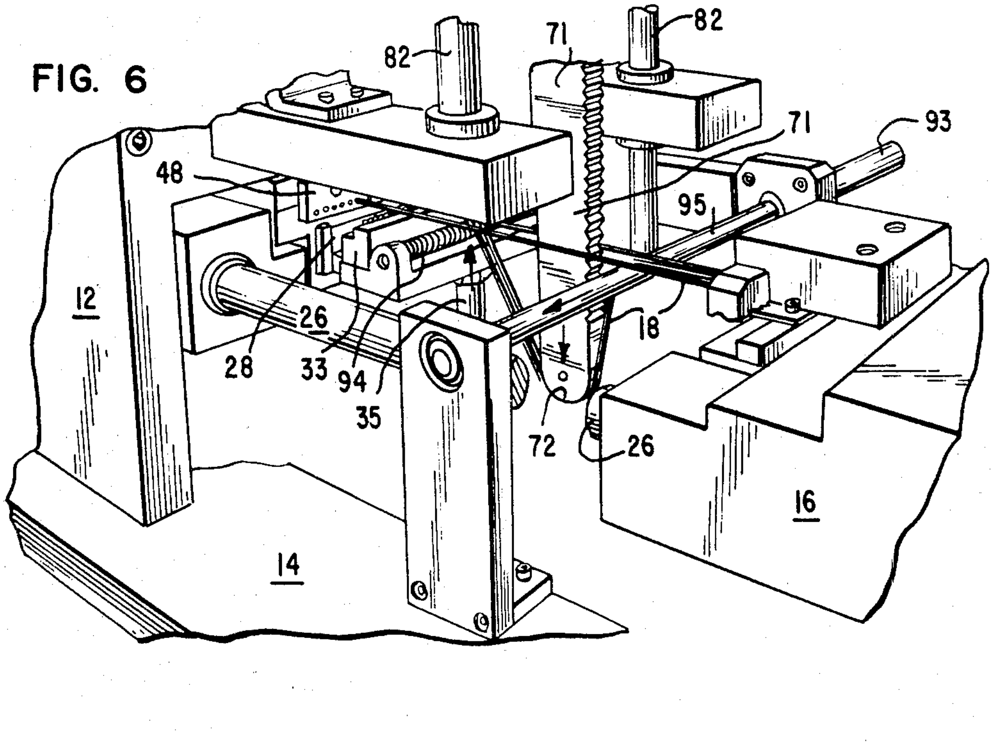
FIG. 6 is a fragmentary, enlarged perspective view of the apparatus of FIG. 5, showing the action of the lead-lengthening probe as it transversely engages some of the leads to move them transversely as shown.

As shown in FIG. 6, lead lengthening probe 71 is adapted to press some or all of lead wires 18 downwardly, to lengthen the amount of the specific leads which are advanced beyond the cutter bar 28. Accordingly, before cutter bar 28 is pushed upwardly by pneumatically operated rod 35, the lengths of the leads which are engaged and pushed transversely by probe 71 may be increased to any desired amount, depending upon the extent of advancement of the probe 71.

As shown in FIG. 5, probe 71 is adapted with its various forward ends to engage a large number of leads, to provide a wiring harness having differing lengths of leads.

The extent of transverse advancement of probe 71 may be controlled, with probe 71 lowering until prevented from further lowering by stop sleeve 79, attached to rods 82 or the actuating rod of pneumatic cylinder 80 as shown. Also, the extent of travel of probe 71 depends upon the position of retainer member 84, which is rigidly clamped to rods 82, and which carries probe 71.

Ratchets or serrations 90 engage set screws 94 within guide members 84, to adjustably position separate segments 85 of probe 71 in any desired longitudinal position on the retainer member 84, so that the lead wires 18 may be lengthened or shortened in the apparatus of this invention as desired without adjustment of the spacing between second station 16 and cutter bar 28. Specifically, fourteen separate segments 85 are shown, which are separately vertically slidable relative to each other except when retained by guide member 84.

Each of the individual lower ends 72 are defined by the separate vertical segments 85, which are shown to be held together to comprise the entire probe 71. These individual segments 85 are longitudinally adjustable with respect to each other, being movable upwardly and downwardly with respect to guide member 84. When the desired position of the respective segments 85 of probe 71 is obtained, the set screws 94 may be tightened to be retained in the recesses of the serrations or ratchet structures 90, for retention of the segments 85 in the desired positions.

It can also be seen that different numbers of segments 85 may be used, with the array of set screws 94 being adaptable for controlling the positions of a number of segments 85 also of different lengths and widths.

Specifically, as shown in FIGS. 13 and 14, it can be seen that each of the separate segments 85 can be controlled by a pair of set screws, for example set screws 94*a,* which are vertically related to each other to control a single, separate segment 85. For example, FIG. 14 shows a sectional view of set screws 94*a.* For high precision of adjustment of each segment 85 of probe 71, the ratchet teeth or serrations 90 may be very small in their dimensions, with set screws 94*a* being positioned so that one set screw can fit between ratchet teeth 94*a,* while the other set screw 94*a* is positioned against an apex of a ratchet tooth 94*a.* Accordingly, each segment 85 can be vertically moved with respect to guide member 84 a minimum of one half of a width of a ratchet tooth or serration 90, simply by releasing the one set screw 94*a* as shown in FIG. 14, and advancing the other set screw 94*a,* which will position members 84, 85 in a new position spaced from the old position by one half of the width of a ratchet tooth.

Accordingly, fine adjustment of each of the separate segments 85 can be achieved, to provide any desired length of the leads 18 being connected to the respective terminals or connectors 22, 98. In FIG. 5, one pattern of the various segments 85 is shown, while in FIG. 13, another pattern is shown. Any other desired pattern may likewise be provided by the apparatus of this invention, including patterns where single segments 85 project upwardly or downwardly from the rest of the group.

Also, as can be seen particularly from FIG. 13, more individual segments may be added to probe 71, or segments may be removed, as desired.

After return of clamp member 20 to its first position at station 12, roller member 91 may also be operated by piston 35, to be raised to engage lead wires 18 as probe 71 is moved downwardly to extend selected lead wires 18. Similarly, the other ends of lead wires 18 are supported by bar 95. Bar 95 is operated by piston 93 to remain out of the way while clamping means is advanced to the second station 16, and then to be advanced horizontally underneath lead wires 18 to serve as a support as shown in FIG. 6, as probe 71 is advanced against lead wires 18. Simultaneously, lead wires 18 adjacent their other end press against roller member 91, with additional wire advancing over roller 91, impelled by the action of probe 71, until the desired lengths of lead wire 18 are achieved.

To permit the reciprocation of clamp member 20, bar 95 may be withdrawn again by means of cylinder 93.

Magazines 68, 96 may each fit into an adjustably-sized receiver 110, as specifically shown for magazine 68 in FIG. 8. Accordingly, differently sized magazines 68 may be utilized for delivering differently sized terminals 22, 98 to the apparatus of this invention or for simultaneously delivering different numbers of terminals.

Receiver 110 in the specific embodiment shown comprises a pair of interconnecting, slidable yoke members 112, 114 which are carried in turn by bracket 116, which may be attached to the frame of the apparatus. Yoke members 112, 114 are attached together by a wing nut 118, which retains bolt member 120 of yoke 114 immovably in slide 122 of the other yoke member 112.

Accordingly, as shown in FIG. 9, a pair of stacks of small-sized terminal members 22*c* may be retained in a stack within magazine 68 which is of proportionately smaller size. Terminal members 22*c* are separated by crimps 115. Alternatively, a different, larger magazine 68*a* may by used to retain a pair of stacks of larger terminal members 22*d*, with yoke members 112, 144 being extended outwardly to accomodate the differently-sized magazines 68.

A similar arrangement may be utilized for retaining magazine 96 as desired.

Magazine 68 and 96 may be made of a transparent material if desired, which permits aligned light source 124 and sensing photocell 126 to be arranged so that when the magazine 68, 96 become emptied of terminals 22 or 98, the light can pass through the magazine to activate the photocell 126. The photocell 126 may be connected to a simple and electrical circuit including switch member 128 that shuts off operation of the entire apparatus of this invention when the light source 124 activates photocell 126, indicating that the magazine 68, 96 has been emptied of terminals.

Push rod 100 may be adjustably retained by bracket 104, which reciprocates along rails 106 to move push rod 100 back and forth, with push rod 100 being retained in bracket 104 by set screw 108. Accordingly, push rod 100 may be positioned in bracket 104 to accurately position the terminals 98 by moving them from the bottom of magazine 96 to the desired position for receiving the ends of lead wires 18.

Referring to FIGS. 11 and 12, the bottom portion of a double-terminal magazine 68 is shown. As in FIG. 9, terminal 68 defines a pair of chambers by means of crimps 115, each of the chambers being adapted to receive a stack of terminals 22*c*. Specifically, in FIG. 11, one of the chambers contains terminals 22*c* while the other is shown to be empty, which is one operating mode of magazine 68 which can be utilized if desired.

Each stack of terminals 22*c* is held from falling out of the bottom of magazine 68 by means of pin 126, which passes through opposed apertures 128 in the side walls of each chamber of magazine 68. After magazine 68 is emplaced in receiver 110, pin 126 can be removed with pliers or the like to cause the terminals 22*c* to be fed into the apparatus, with the stack of terminals falling down so that push rod 70 can move them one-by-one into position for engagement with lead wires 18.

Magazine 96, although curved in shape, can be of similar construction to that described above.

FIG. 16 shows various major steps of operation of the apparatus of this invention.

As shown in FIG. 16*a*, gripping means 20 receives and grasps lead wires 18, with the lead wire 18 projecting through retractable plate member 48, extending beyond plate 48 a small distance or being essentially flush with it. Rear magazine 96 for applying terminals 98 is also shown.

In FIG. 16*b*, gripper member 20 advances leads 18 to terminal 22, with plate member 48 being collapsed to allow leads 18 to project out farther into engagement with terminal or terminals 22. Magazine 68 for supplying terminal or terminals 22 is also shown.

In FIG. 16*c*, platen 59 raises terminal 22 into engaging relation with leads 18. Clamping member 20 and plate 48 are withdrawn again.

After this, bar member 95 is transversely advanced into position as described and probe member 71 is advanced, causing selective lead wires to be lengthened with the wire advancing over roller member 94. Plunger 35 raises roller 94 along with wire emplacement members 33. Wire cutter bar 28 performs its job. Cylinder 37 advances the cut wire ends, and retention member 130 is moved downwardly to rpess terminal 98 from its upper side to emplace lead wires 18 into terminals 98. Then the machine parts are withdrawn to their original positions, for the next cycle.

As the result of this, a completed harness is provided as shown in FIG. 16*e*, which may be released to drop through aperture 68. The specific complete harness showed carries a pair of terminals 22 and a single terminal 98, although single or multiple terminals of all types and combinations are contemplated to be made on the apparatus of this invention.

The above has been offered for illustrative purposes only, and is not intended to limit the invention of this application, which is as defined in the claims below.

That which is claimed is:

1. An apparatus for applying terminals to a plurality of leads including a clamping means for gripping and advancing said leads from a supply source toward a first terminal; means for bringing said terminal and said leads into electrically conductive engagement; and means for severing said leads into segments of predetermined length, the improvement comprising: lead lengthening probe means, said probe means being proportioned to transversely engage at least one of said leads at a position between its end and move it to a position transveresly of said direction of advancement, to lengthen the extent of said lead which is advanced beyond said severing means, said probe means includes a plurality of longitudinally separate segments which are longtudinally adjustable with respect to each other, said segments being retained together by a retainer member which is slidably mounted and adapted for motion in the longitudinal direction of said segments, said segments define a serrated surface facing said retainer member, said retainer member in turn defining an array of set screw members whereby said screw members of the guide member interract with the serrations to retain the vertical segments in the desired position, said retainer member provides a pair of longitudinally spaced set screw members for each vertical segment, the set screw members begin positioned so that when one set screw is positioned between a pair of serrations, the other set screw is positioned adjacent a peak of a serration.

* * * * *